United States Patent
Itoh

(10) Patent No.: US 7,460,878 B2
(45) Date of Patent: Dec. 2, 2008

(54) RADIO COMMUNICATION SYSTEM AND RADIO COMMUNICATION DEVICE THAT PERIODICALLY COMPARES TRANSMISSION POWER WITH A MAXIMUM VALUE TO DETERMINE A TRANSMISSION MODE

(75) Inventor: Katsutoshi Itoh, Tokyo (JP)

(73) Assignee: Sony Ericsson Mobile Communications Japan, Inc., Tokyo (JP)

( * ) Notice: Subject to any disclaimer, the term of this patent is extended or adjusted under 35 U.S.C. 154(b) by 576 days.

(21) Appl. No.: 10/931,418

(22) Filed: Sep. 1, 2004

(65) Prior Publication Data

US 2005/0053032 A1    Mar. 10, 2005

(30) Foreign Application Priority Data

Sep. 2, 2003    (JP)    ............................ P2003-309660

(51) Int. Cl.
*H04B 7/00*    (2006.01)
(52) U.S. Cl. ........................... 455/522; 522/69; 375/222
(58) Field of Classification Search ................. 455/522, 455/69; 370/329; 375/222
See application file for complete search history.

(56) References Cited

U.S. PATENT DOCUMENTS 5,659,582 A  *  8/1997  Kojima et al. ............... 375/345
6,879,839 B2 *  4/2005  Kosugi ......................... 455/522
2002/0061073 A1 *  5/2002  Huang et al. ................. 375/295
2002/0176482 A1    11/2002  Chien

FOREIGN PATENT DOCUMENTS

| EP | 1 259 015 | 11/2002 |
|---|---|---|
| EP | 1 437 912 | 7/2004 |
| WO | WO 01 91322 | 11/2001 |
| WO | WO 01/91322 A1 * | 11/2001 |
| WO | WO 02 084930 | 10/2002 |
| WO | WO 02/084930 A2 * | 10/2002 |
| WO | WO 03 026189 | 3/2003 |

* cited by examiner

*Primary Examiner*—Matthew Anderson
*Assistant Examiner*—Perez M Angelica
(74) *Attorney, Agent, or Firm*—Frommer Lawrence & Haug LLP; William S. Frommer; Thomas F. Presson

(57) ABSTRACT

In the mobile terminal, the reception quality estimating unit measures a reception quality, and at least one of the data buffer monitoring unit and the transmission power monitoring unit measures a data transmission capability. Based on the measured reception quality and data transmission capability, the terminal determines a transmission mode to be used, and reports it to the base station. The base station determines the transmission mode to be practically used in accordance with the reported transmission mode, and notifies it to the mobile terminal. The base station transmits data according to the determined transmission mode, and the mobile terminal receives data according to the notified transmission mode. Thereby, the radio communication system determines the transmission mode in consideration for not only the reception quality, but also the deficiency in the data transmission capability of the terminal.

23 Claims, 11 Drawing Sheets

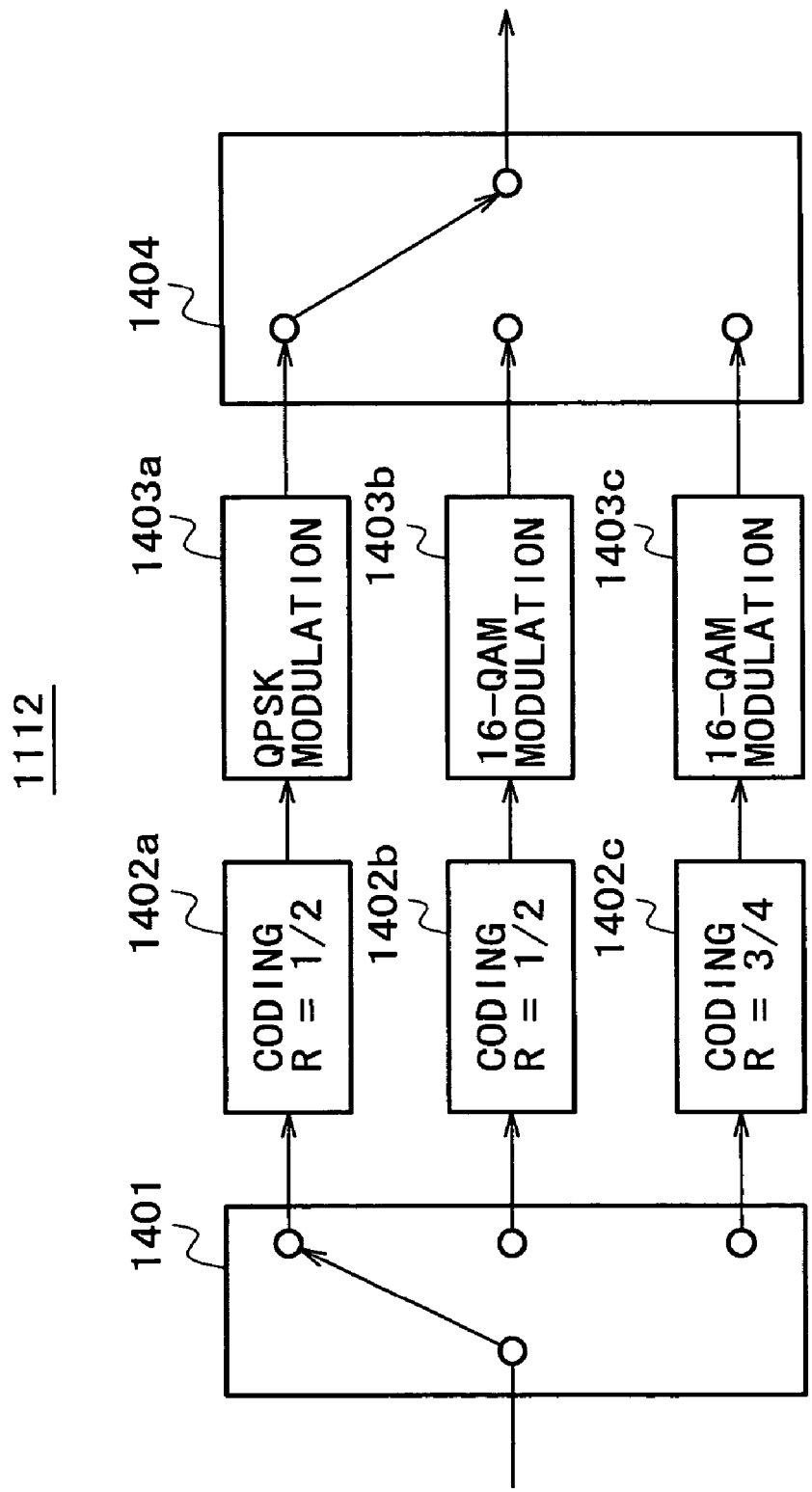

RADIO COMMUNICATION SYSTEM AND RADIO COMMUNICATION DEVICE THAT PERIODICALLY COMPARES TRANSMISSION POWER WITH A MAXIMUM VALUE TO DETERMINE A TRANSMISSION MODE

BACKGROUND OF THE INVENTION

1. Field of the Invention

The present invention relates to a radio communication system and a radio communication device that perform data transmissions while varying the transmission mode composed of a modulation system and a coding ratio and so forth.

2. Description of the Related Art

The adaptive modulation & coding ratio communication system has been developed which varies the coding ratio of an error correction code and the modulation system (multi-valued modulation factor) in accordance with the quality of a propagation path. The system provides a user having a good quality of a propagation path with a high-speed data communication while sacrificing the noise durability, and provides a user having a poor quality of a propagation path with a low-speed data communication while taking full account of the noise durability.

The communication system using such adaptive modulation has been introduced in the radio communication system. As an example, the EDGE (Enhanced Data GSM Environment), CDMA 2000, HDR (High Data Rate) system and so forth can be quoted. Also in the W-CDMA (Wideband Code Division Multiple Access) is additionally adapted the same system (HSDPA: High Speed Downlink Packet Access). This system implements the adaptive modulation & coding ratio according to the basic procedure as follows.

1. a terminal measures the reception quality of a signal transmitted from a base station,
2. the terminal notifies the base station of the modulation system & coding ratio (hereunder, referred to as 'mode request message') that is regarded as the optimum from the measurement result of the reception quality,
3. based on the mode request message transmitted from the terminal and the state of the resources at the base station, the base station determines the modulation system & coding ratio (generically called transmission mode) that is allocated in practice, and transmits the parameters (transmission parameters) of the determined transmission mode to the terminal,
4. the base station transmits user data based on the determined transmission parameters,
5. the terminal receives the transmission parameters, and carries out the data reception processing based on the transmission parameters, and
6. when detecting errors in the reception data, the terminal replies a retransmission request to the base station, and when receiving data correctly, the terminal replies a new data transmission request to the base station.
7. the system periodically repeats the above steps 1 through 6.

FIG. 10 and FIG. 11 illustrate this processing procedure. FIG. 10 illustrates the relation between the down control channel that notifies the terminal of the transmission parameters relating to the down data transmission from the base station, the down data channel that transmits the user data from the base station, and the up control channel that transmits the transmission parameter request from the terminal. This drawing shows an example in which the above steps 1 through 6 are carried out within a frame cycle. FIG. 11 illustrates the signal transmission & reception sequence between the terminal and the base station using the above channels, which corresponds to FIG. 10.

The base station varies the data transmission rate in accordance with the reception state (reception quality) of the user terminal during transmitting the down data, and transmits the data to the user terminal more efficiently. Further, taking full account of the system efficiency, the base station allocates a predetermined radio resource for the data transmission to the user terminal having a comparably good reception quality against the long-term average reception quality.

However in general data transmissions, it is necessary to transmit data from the terminal to the base station as a reply for the data that the user received, other than the data transmitted from the base station to the terminal. Although the reception quality is good at the terminal, when there are deficiencies in the data transmission capability, resulting from an insufficiency of the up transmission power and a quality degradation of the up link and so forth, there can be a case that the radio resource for the data transmission allocated to the terminal becomes useless unavoidably. Therefore, it is desirable that the base station carries out the down data transmission in consideration for the current data transmission capability of the terminal.

The present invention has been made in view of these circumstances, and provides a radio communication system and a radio communication device capable of determining a transmission mode in consideration for not only the reception quality of the terminal but also the deficiency in the data transmission capability thereof.

SUMMARY OF THE INVENTION

According to one aspect of the invention, the radio communication system includes a first radio communication device and a second radio communication device that mutually perform radio communications. The radio communication system varies the transmission mode according to the conditions at least in the data transmission from the first radio communication device to the second radio communication device. The second radio communication device measures a reception quality as well as a data transmission capability. Based on the measured reception quality and data transmission capability, either one of the first and second radio communication devices determines a transmission mode. The first radio communication device performs a data transmission to the second radio communication device according to the determined transmission mode.

As a concrete manner of the transmission mode that either one of the first and second radio communication devices determines, the following three can be quoted. (1) The second device determines a transmission mode primarily, and based on this, the first device determines a transmission mode finally. (2) The first device adopts the transmission mode as it is, that the second device determined. (3) The second device provides the first with necessary information to judge, and the first device determines the transmission mode.

This radio communication system determines a transmission mode in consideration for not only the reception quality of the second radio communication device but also the data transmission capability thereof. Therefore, if the reception quality is comparably good, but if the data transmission capability is lowered, taking this point into consideration, the system determines, for example, a transmission mode whereby the allocation of the radio resource for the data transmission is restricted.

The data transmission capability is determined on the basis of at least one of the transmission power of the second device and the data quantity of a transmission data buffer of the second device.

For example, if the transmission power is the maximum, the system judges that the desired data cannot reach the base station; and even if the reception quality is comparably good, the system determines a transmission mode whereby the allocation of the radio resource for the data transmission is restricted.

Or, if the data quantity of the transmission data buffer is sufficient, the system judges that the data transmission is not smoothly carried out; and at the moment that the buffer quantity exceeds a constant quantity, the system determines a transmission mode whereby the allocation of the radio resource for the data transmission is restricted. Such variations of the transmission mode can be set to plural steps according to the data quantity of the transmission data buffer.

The transmission mode is stipulated by at least one of the modulation system and the coding ratio.

According to another aspect of the invention, the radio communication receives data transmissions based on the transmission mode varied in accordance with conditions by the other radio communication device. The radio communication device includes a reception quality measuring means that measures a reception quality, a data transmission capability measuring means that measures a data transmission capability, a means that determines a transmission mode on the basis of the measured reception quality and data transmission capability, a means that transmits the determined transmission mode to one other radio communication device, a means that receives the information on a transmission mode for use from the other radio communication device, and a means that receives the data from the other radio communication device according to a transmission mode designated by the information on the received transmission mode.

In this radio communication device, the reception quality measuring means measures a reception quality, and the data transmission capability measuring means measures a data transmission capability. On the basis of the measured reception quality and data transmission capability, the radio communication device determines a transmission mode. And, the radio communication device transmits the transmission mode thus determined to the other radio communication device. Receiving the information on the transmission mode from the other radio communication device, the radio communication device receives the data from the other radio communication device according to the transmission mode designated by the information on the received transmission mode.

According to another aspect of the invention, the radio communication device receives data transmissions based on the transmission mode varied in accordance with conditions by the other radio communication device. The radio communication device includes a reception quality measuring means that measures a reception quality, a data transmission capability measuring means that measures a data transmission capability, a means that transmits the information on the measured data transmission capability and reception quality to one other radio communication device, a means that receives the information on a transmission mode that the other radio communication device determined on the basis of the information on the measured data transmission capability and reception quality, and a means that receives the data from the other radio communication device according to a transmission mode designated by the information on the received transmission mode.

In this radio communication device, the reception quality measuring means measures a reception quality, and the data transmission capability measuring means measures a data transmission capability. The radio communication device transmits the information on the measured data transmission capability and reception quality to the other radio communication device. Receiving the information on the transmission mode that the other radio communication device determined on the basis of the information on the measured data transmission capability and reception quality, the radio communication device receives the data from the other radio communication device according to the transmission mode designated by the information on the received transmission mode.

In the above radio communication device, the information on the measured data transmission capability and reception quality may be transmitted as individual and separate information, or the information may be transmitted as one piece of information that the reception quality is corrected by the data transmission capability.

In the radio communication device that measures the data quantity of the transmission data buffer, a transmission mode corresponding to a lower reception quality is selected as the data quantity of the transmission data buffer approximates to a predetermined memory quantity.

Further in a concrete embodiment of this invention, in which the radio communication system varies the modulation and coding in accordance with the reception quality of the terminal, the terminal device measures the instantaneous transmission power of the terminal. And, when the transmission power becomes the maximum, the system selects the transmission mode according to the lowest reception quality (for example, OOR, mentioned later), regardless of the conditions of the terminal reception quality. In such conditions, the system prevents the allocation of the radio resources by the base station.

In another embodiment, in which the radio communication system varies the modulation and coding according to the reception quality of the terminal, the terminal device measures a transmission data buffer quantity. The system adjusts the reception quality or the transmission mode to be reported in accordance with the buffer quantity, and prevents the allocation of the radio resources by the base station under the conditions where the data transmissions are not smoothly carried out. The adjustment of the transmission mode in this case is carried out in accordance with the transmission data buffer quantity. As the data quantity approximates to a predetermined memory quantity, the system selects a transmission mode corresponding to a lower reception quality than the actual reception quality.

The system according to this invention determines the transmission mode in consideration for the information on the reception quality as well as the transmission capability. Accordingly, the system will save a uselessly excessive allocation of the radio resources for data transmissions, thus achieving an efficient allocation of the radio resources. This invention can easily be introduced by using only the conventional interface such as the mode request message.

BRIEF DESCRIPTION OF THE DRAWINGS

FIG. 3 illustrates a detailed construction of the adaptive coding & modulating unit in FIG. 2;

FIG. 4 illustrates the relation between the coded data and the one symbol, in which

DETAILED DESCRIPTION OF THE PREFERRED EMBODIMENTS

The preferred embodiments of the invention will now be described in detail referring to the accompanying drawings.

Figure 1:
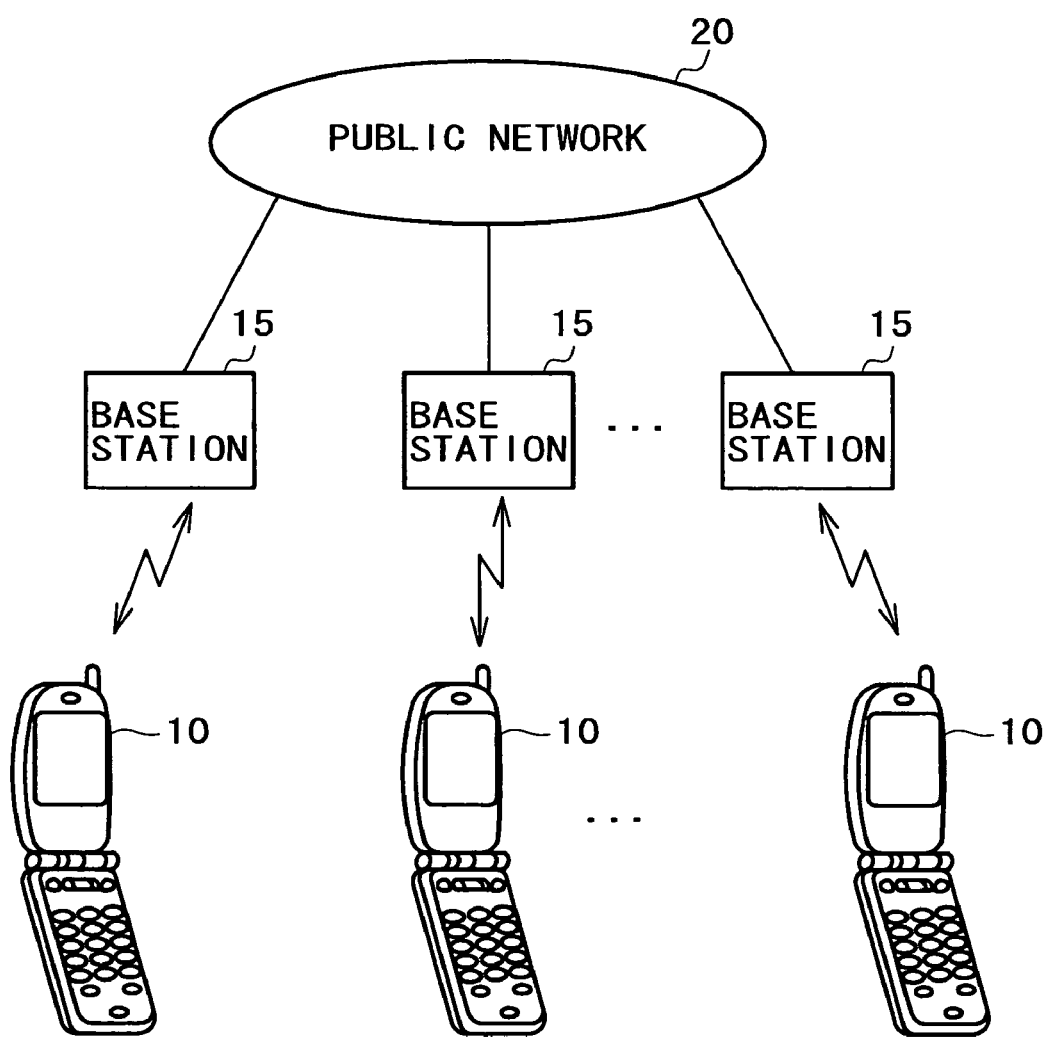
FIG. 1 schematically illustrates the whole construction of a radio communication system relating to the embodiment of the present invention.

FIG. 1 schematically illustrates the whole construction of a radio communication system relating to the embodiment of the present invention. It is assumed that this communication system provides the communication service, the service area is divided into cells of a desired size, and each of the cells contains a base station 15 being a fixed radio station. These base stations 15 are connected to mobile terminals (user terminals) 10 being mobile radio stations, by means of a predetermined radio communication system such as the W-CDMA. The base stations are connected to a public network 20 through channels. To the public network 20 are connected the Internet, multiple subscriber cable terminals, computer networks, and so forth, which are not illustrated.

Figure 2:
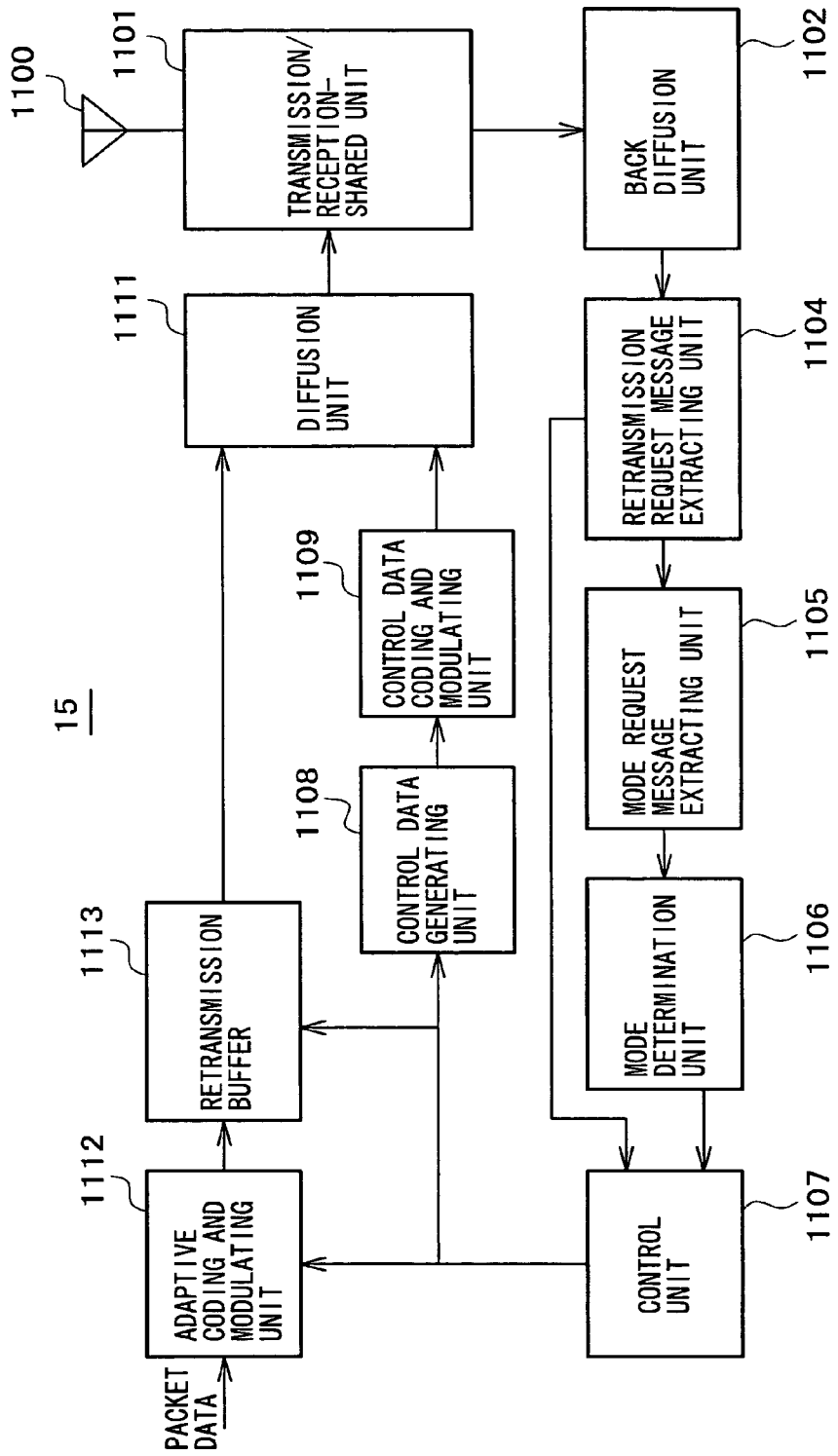
FIG. 2 illustrates a construction of the base station that implements the communication system of the invention.

FIG. 2 illustrates a construction of the base station 15 that implements the communication system as mentioned above.

The base station 15 includes: a transmission & reception antenna 1100, a transmission/reception-shared unit 1101, a back diffusion unit 1102, a retransmission request message extracting unit 1104, a mode request message extracting unit 1105, a mode determination unit 1106, a control unit 1107, a control data generating unit 1108, a control data coding & modulating unit 1109, a diffusion unit 1111, an adaptive coding & modulating unit 1112, and a retransmission buffer 1113.

The base station 15 receives a transmission signal from a user by the antenna 1100 and the transmission $ reception-shared unit 1101; and the back diffusion unit 1102 demodulates the received signal.

The retransmission request message extracting unit 1104 extracts the retransmission request message, which is transferred to the control unit 1107. The mode request message extracting unit 1105 extracts the mode request message, which is transmitted to the mode determination unit 1106. The retransmission request message and the mode request message are extracted in each frame (one frame is configured with N-slots)

The mode determination unit 1106 determines the optimum modulation system & coding ratio from the mode request message and the state of the resources at the base station, and allocates the radio resources for data transmissions such as coding resources and power resources to the user.

The control unit 1107 checks whether there is the retransmission request message in the first place; if there is, the control unit 1107 transfers the first transmission mode and the retransmission flag to the control data generating unit 1108, adaptive coding & modulating unit 1112, and retransmission buffer 1113, and if there is not, the control unit 1107 transfers the transmission mode determined by the mode determination unit 1106 to the above three units.

The control data generating unit 1108 generates a message for communicating the transmission parameters selected by the control unit 1107 to the user terminal.

The adaptive coding & modulating unit 1112 codes & modulates the transmission signal in accordance with the coding system (concretely, the coding ratio) and modulation system selected by the control unit 1107.

FIG. 3 illustrates a detailed construction of the adaptive coding & modulating unit 1112. In the drawing, the coding system contains the coding ratio of R=1/2 and the coding ratio of R=3/4. The coding units 1402a and 1402b of the coding ratio R=1/2 add one redundancy bit per one bit of the input data. The coding unit 1402c of the coding ratio R=3/4 adds one redundancy bit per three bits of the input data. The code of the coding ratio R=1/2 has comparably large redundancy bits, and it is strong in the error correction capability accordingly, but it decreases the quantity of user data that can be transmitted. On the other hand, the code of the coding ratio R=3/4 is inferior to the code of the coding ratio R=1/2 with regard to the error correction capability, but it increases the quantity of user data that can be transmitted.

Figure 4A:
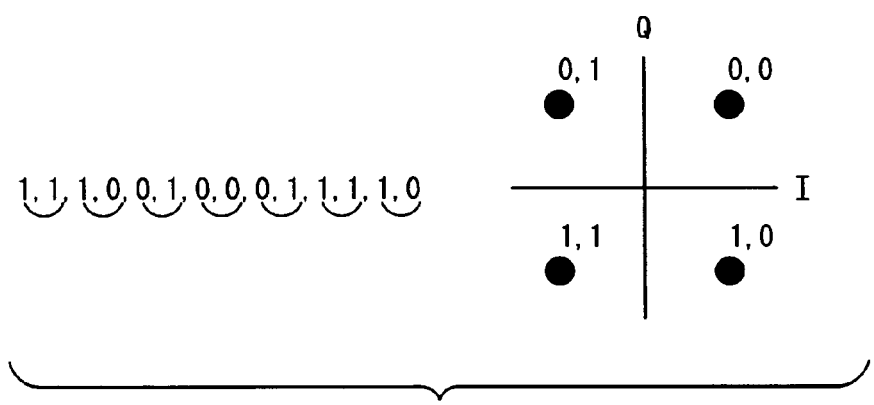
FIG. 4A illustrates the case in the QPSK modulation.
Figure 4B:
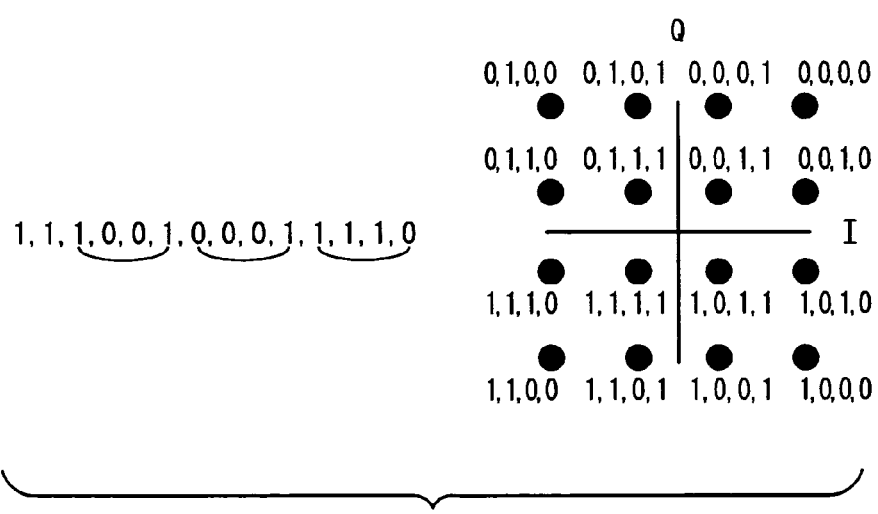
FIG. 4B illustrates the case in the 16-QAM modulation.

As the modulation system, the QPSK modulation and the 16-QAM modulation are available. As illustrated in FIG. 4A and FIG. 4B, the QPSK modulation unit 1403a maps the coded 2-bits data into one symbol, and the 16-QAM modulation units 1403b and 1403c map the coded 4-bits data into one symbol. If the transmittable symbol rate is made constant, actually the QPSK modulation will have more transmittable data than the QPSK modulation, but the noise characteristic becomes worse because the distance between the symbols becomes shorter.

The switches 1401 and 1404 select the coding and modulation systems of the input data; the coding unit 1402 adds the error correction code to the data; and the modulation unit 1403 maps the data into the modulated symbol. Here, if there is the retransmission flag, the control unit 1107 will not work this function.

The retransmission buffer 1113 stores the data having been transmitted. If there is a retransmission instruction from the control unit 1107, the retransmission buffer 1113 transmits the data being stored, and if there is not, it erases the data transmitted in the past and stores the data newly transferred from the adaptive coding & modulating unit 1112.

The diffusion unit 1111 diffuses the transmission signal and control data that experienced the coding & modulation processing by using each different diffusion codes, which are transmitted to the user terminal.

Figure 5:
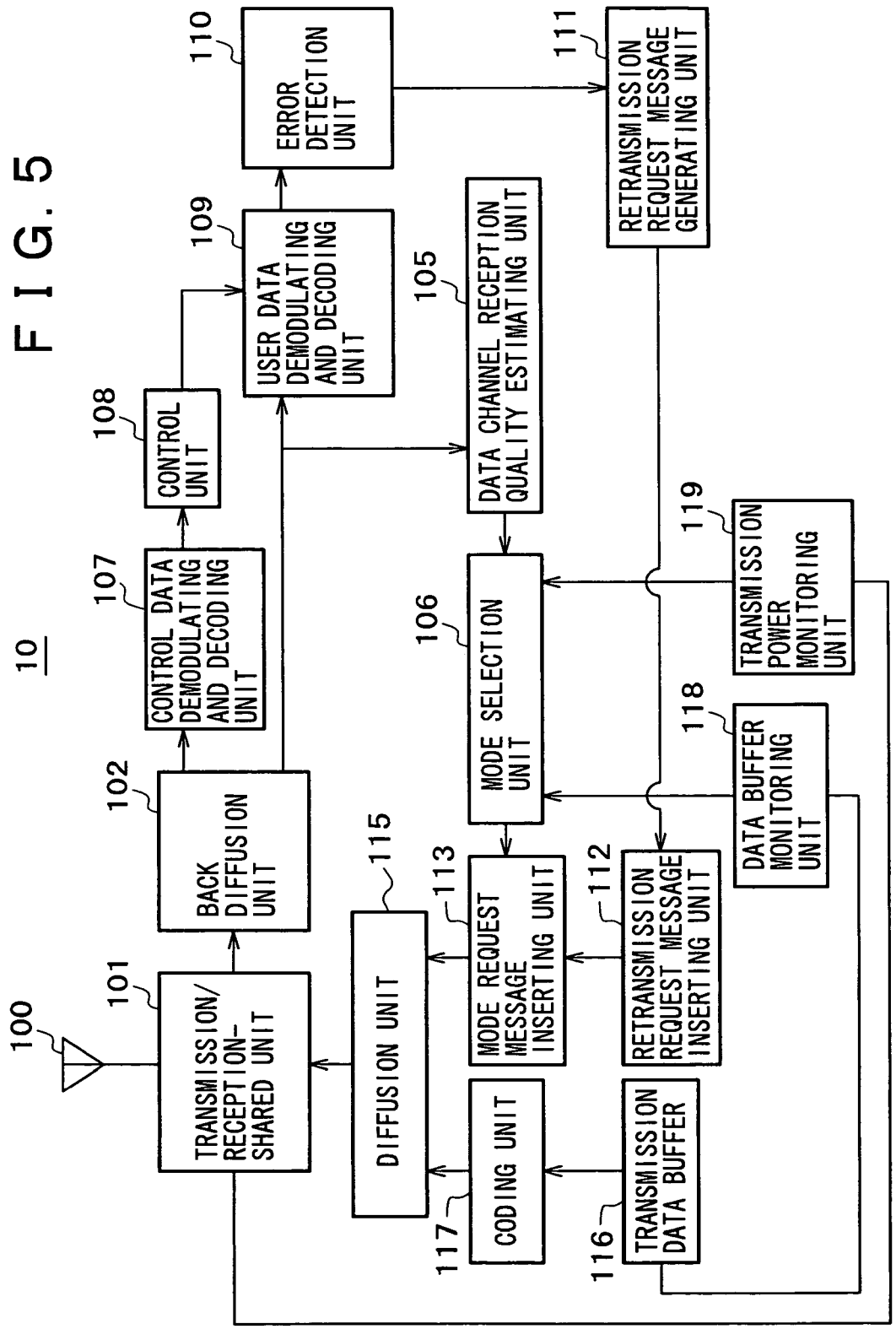
FIG. 5 illustrates a construction of the user terminal relating to the embodiment of the invention.

FIG. 5 illustrates a construction of the user terminal (mobile terminal 10) relating to the embodiment that implements the above communication system.

The user terminal includes: a transmission & reception antenna 100, a transmission/reception-shared unit 101, a back diffusion unit 102, a data channel reception quality estimating unit 105, a mode selection unit 106, a control data demodulating & decoding unit 107, a control unit 108, a user data demodulating & decoding unit 109, an error detection unit 110, a retransmission request message generating unit 111, a retransmission request message inserting unit 112, a mode request message inserting unit 113, a diffusion unit 115, a data buffer monitoring unit 118, and a transmission power monitoring unit 119.

The transmission signal transmitted from the base station is received by the antenna 100 and transmission/reception-shared unit 101, and the signal is split into the control channel and the user data channel by the back diffusion unit 102.

The control channel signal is inputted to the control data demodulating & decoding unit 107. The control data demodulating & decoding unit 107 detects the information on the coding system and modulation system (transmission mode) being applied to the user data channel. The control unit 108 executes the mode setting in the user data demodulating & decoding unit 109. The processing contents in this part will be described later with the flow chart in FIG. 6.

On the other hand, the user data channel signal is inputted to the data channel reception quality estimating unit 105 and user data demodulating & decoding unit 109.

The data channel reception quality estimating unit 105 estimates a Signal to Noise Ratio (SNR) of the user data channel, or a Signal to Interference power Ratio (SIR), as the index of the reception quality. The method of estimating the Signal to Noise Ratio is widely known. The SNR can be estimated, for example, by using the pilot symbol that is time-division-multiplexed on the user data channel, or by using the pilot channel symbol being transmitted in parallel to the user channel. The estimated value of the reception quality is inputted to the mode selection unit 106. According to the estimated value of the reception quality, the mode selection unit 106 selects the combinations (namely, transmission modes) of the modulation system and the coding ratio to be requested to the base station, and generates the mode request message. This processing is executed in each frame.

Figure 6:
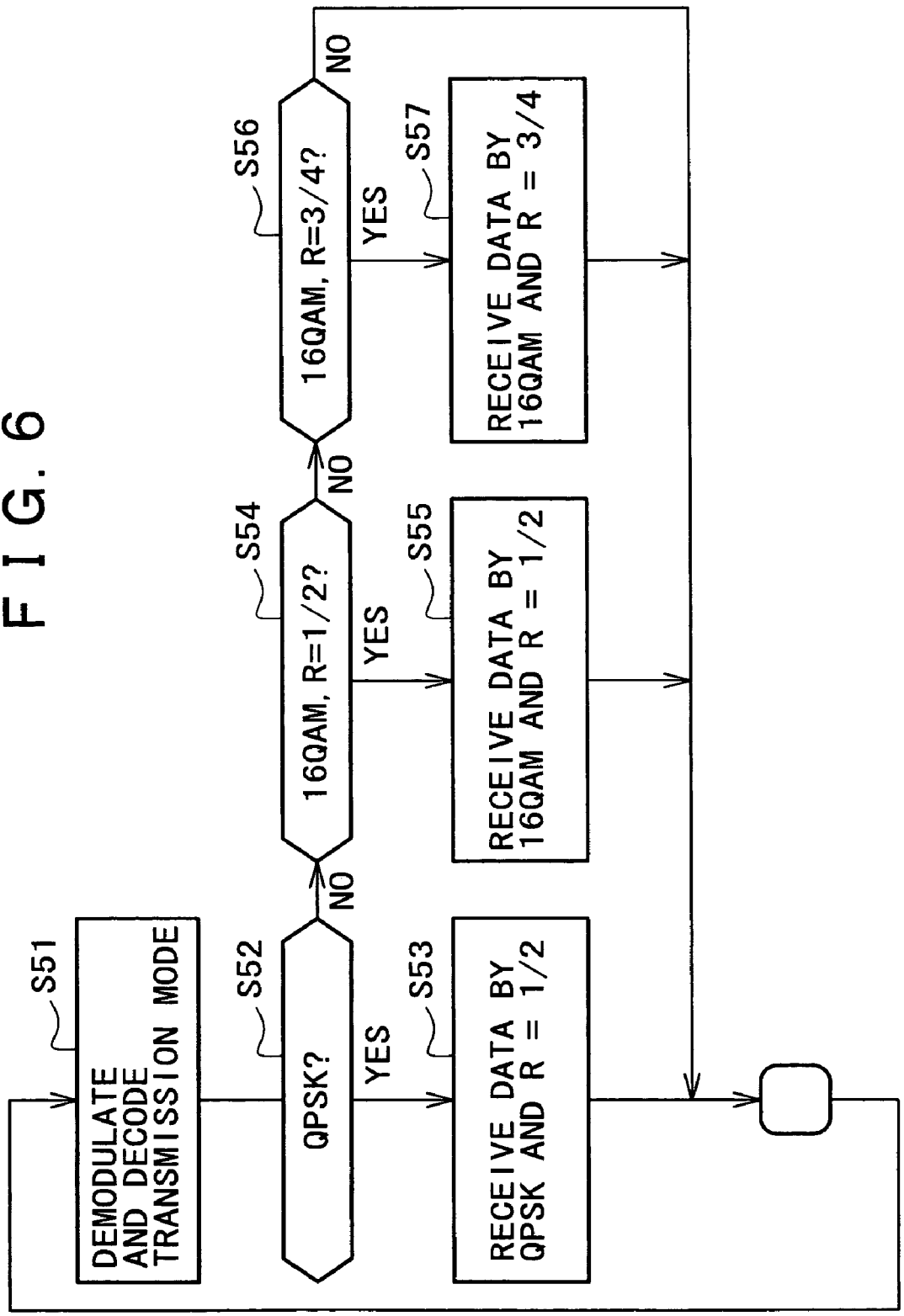
FIG. 6 illustrates a processing flow of the mode setting of the user data demodulating & decoding unit in FIG. 5.

FIG. 6 illustrates a processing flow of the mode setting of the user data demodulating & decoding unit 109. The first step (S51) demodulates and decodes the data from the control unit 108 to detect the transmission mode. If the transmission mode is the QPSK modulation (Yes at S52), S53 receives (demodulates and decodes) the data by the QPSK modulation and the coding ratio R=1/2. If the transmission mode is not the QPSK modulation, but the 16QAM modulation and R=1/2 (Yes at S54), S55 receives the data by the 16QAM modulation and the coding ratio R=1/2. If the transmission mode is the 16QAM modulation and R=3/4 (Yes at S56), S57 receives the data by the 16QAM modulation and the coding ratio R=3/4.

Hereunder, the method of selecting the combinations (namely, transmission modes) of the modulation system and the coding ratio will be described.

As mentioned above, depending on the combinations of the modulation system and the coding ratio, the transferable data quantity and the noise durability of the data will differ. And, in view of the data transfer quantity, there is the relation: (R=1/2, QPSK)<(R=1/2, 16QAM)<(R=3/4, 16QAM). However, in view of the noise durability, there is the relation: (R=1/2, QPSK)>(R=1/2, 16QAM)>(R=3/4, 16QAM). Thus in this embodiment, in case of a good transmission path having a less noise (in case of a good reception quality), it is possible to select a combination of the coding system and the modulation system having a larger data transfer quantity. And, in case of a very bad transmission path having much noise (in case of a bad reception quality), it is possible to suppress the data transfer quantity to reinforce the error correction performance.

Figure 7:
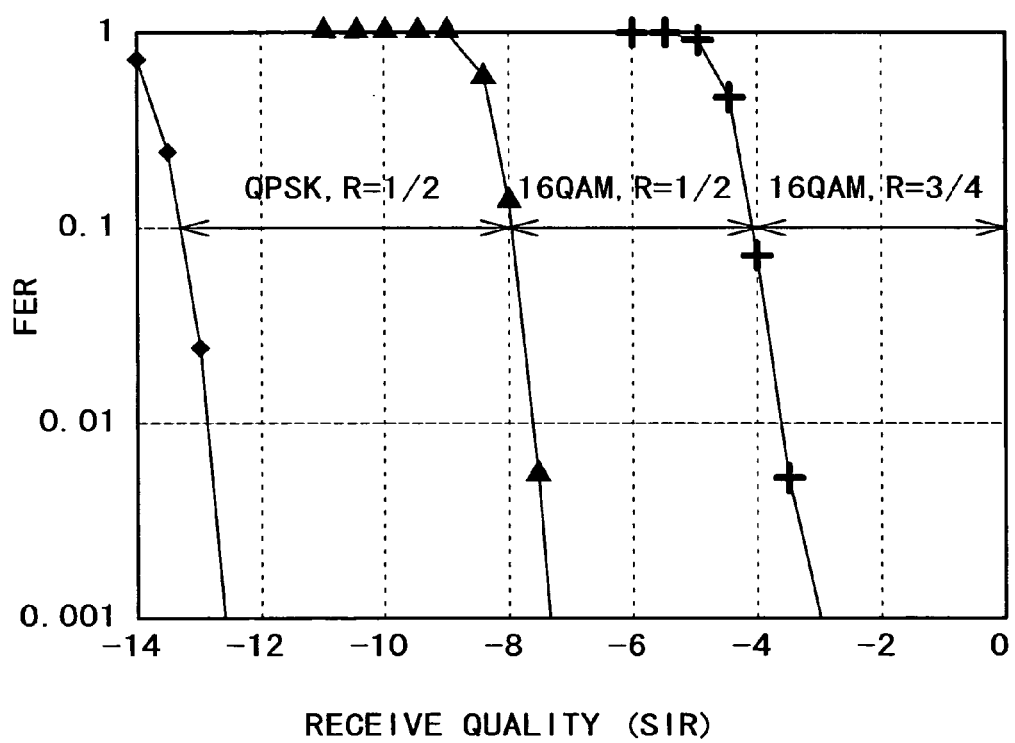
FIG. 7 illustrates an example of selecting the combinations of the modulation system and the coding ratio.

FIG. 7 illustrates an example of selecting the combinations of the modulation system and the coding ratio. The drawing shows the relation between the reception quality (SIR) and the Frame Error Rate (FER), in regard to each transmission mode. The graph serves to select the combination of the modulation system and coding ratio of which the FER is less than 10% with regard to the estimated value of the reception quality. When the estimated reception quality is not more than −13 dB, the OOR (Out Of Range) is selected on the premise that any combination cannot maintain the FER of 10%. In the OOR, the base station does not transmit the data. When the estimated reception quality is not more than −8 dB, the QPSK and R=1/2 is selected. When it is not less than −4 dB, the 16QAM and R=3/4 is selected. When it is other than these, the 16QAM and R=1/2 is selected.

The user data demodulating & decoding unit 109 decodes and demodulates the data according to the decoding system and the demodulating system set by the control unit 108, and outputs the result as the reception signal.

The error detection unit 110 performs the parity check using the Cyclic Redundancy Check (CRC) code, and checks if the demodulated data contain errors. The retransmission request message generating unit 111 generates a message for replying the result to the base station. For example, when the data is checked not to contain errors, it generates 0, and when the data is checked to contain errors, it generates 1.

The retransmission request message and the mode request message thus generated are given the framings respectively in the retransmission request message inserting unit 112 and the mode request message inserting unit 113, which are transmitted to the base station through the diffusion unit 115 and the transmission/reception-shared unit 101. By using the above construction, the system is able to vary the data transmission speed in accordance with the reception conditions of the user terminal, and to transmit the data to the user terminal with more efficiency. However, the above selection of the modulation system and the coding ratio takes only the reception quality into account. This invention further takes the transmission capability into account, which will be mentioned later, and makes the final selection of the combinations of the modulation system and the coding ratio.

Figure 8:
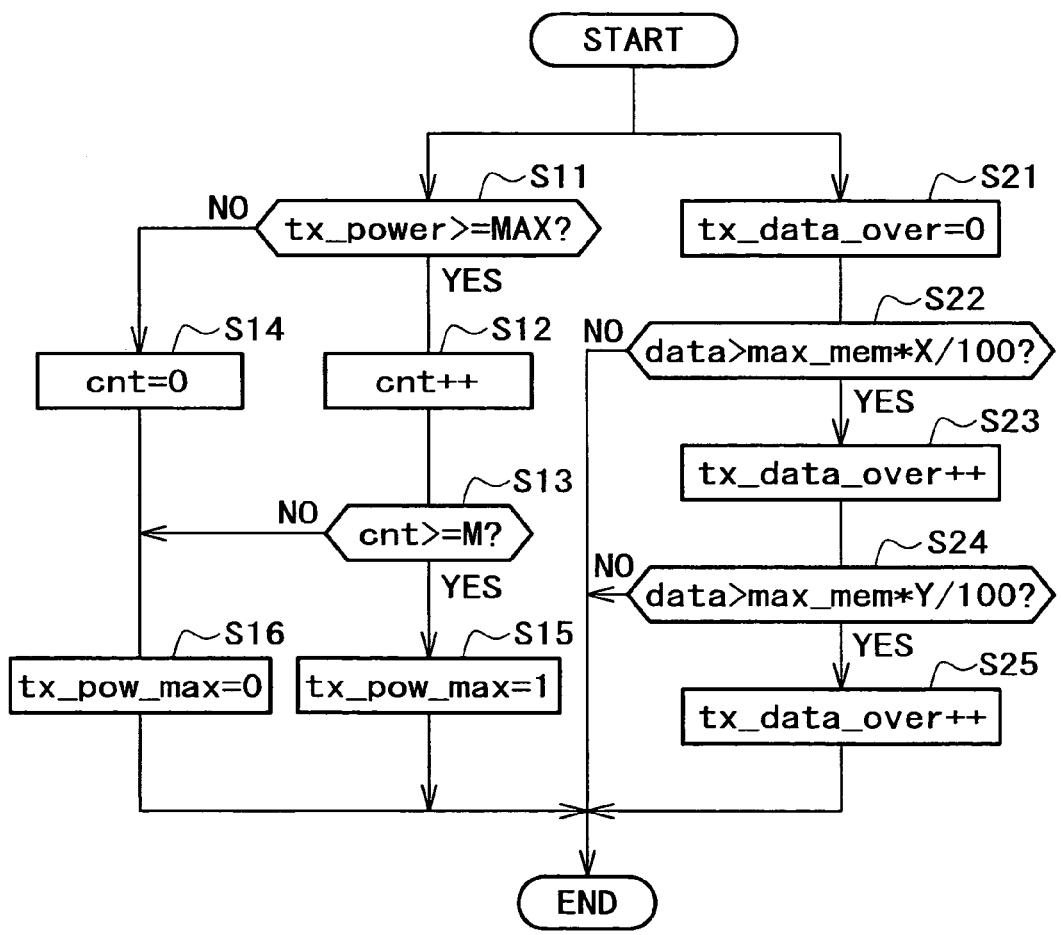
FIG. 8 illustrates a processing flow of the transmission power monitoring unit and the data buffer monitoring unit in FIG. 5.

In order to implement the above, the transmission power monitoring unit 119 periodically measures the absolute transmission power of the transmission/reception-shared unit 101, and monitors whether or not the transmission power is in a predetermined state. The steps S11 through S16 in FIG. 8 shows the processing of the transmission power monitoring unit 119. This processing is carried out periodically (for example, at each interval of 0.667 msec). Concretely, the step S11 checks if the measured power tx_power exceeds a predetermined maximum value MAX. If it does not, the step S14 resets a counter value cnt to 0, and the step S16 sets a flag tx_pow_max to 0. On the other hand, if the power tx_power measured at S11 exceeds the predetermined maximum value MAX, the step S12 increments the counter value cnt, and the step S13 checks if the counter value cnt exceeds a predetermined value M. The predetermined value M signifies the frequency (for example, 8 to 9 times) that is defined by the terminal or designated by the network. If the counter value cnt exceeds the predetermined value M at S13, it will find that the measured power tx_power exceeds the maximum transmission power continuously by M times. In that case, the step S15 outputs the flag tx_pow_max=1. If the measured power tx_power falls below the predetermined maximum value MAX even once, the step S16 returns the flag tx_pow_max to 0.

The data buffer monitoring unit 118 measures the data quantity stored in a transmission data buffer 116 to monitor whether the data quantity is in a predetermined state or not.

The steps S21 through S25 in FIG. 8 show the processing of the data buffer monitoring unit 118. This processing is carried out periodically as well (for example, at each interval of 0.667 msec). Concretely, the step S21 resets the valuable tx_data_over of three values (0, 1, 2) representing the data quantity level of the transmission data buffer to 0. Next, the step S22 checks if the data quantity data of the transmission data buffer 116 exceeds X % (for example, 90%) of the maximum memory capacity (max_mem). If it does not exceed, the current processing will be terminated. If it exceeds, the step S23 increments the valuable tx_data_over. That is, the valuable tx_data_over is increased to 1. Further, as the data quantity data exceeds Y % (for example, 95%) of the maximum memory capacity (Y>X) (Yes at S24), the step S25 increments the valuable tx_data_over. That is, the valuable tx_data_over is increased to 2. In the other cases, the valuable tx_data_over is 0.

Figure 9:
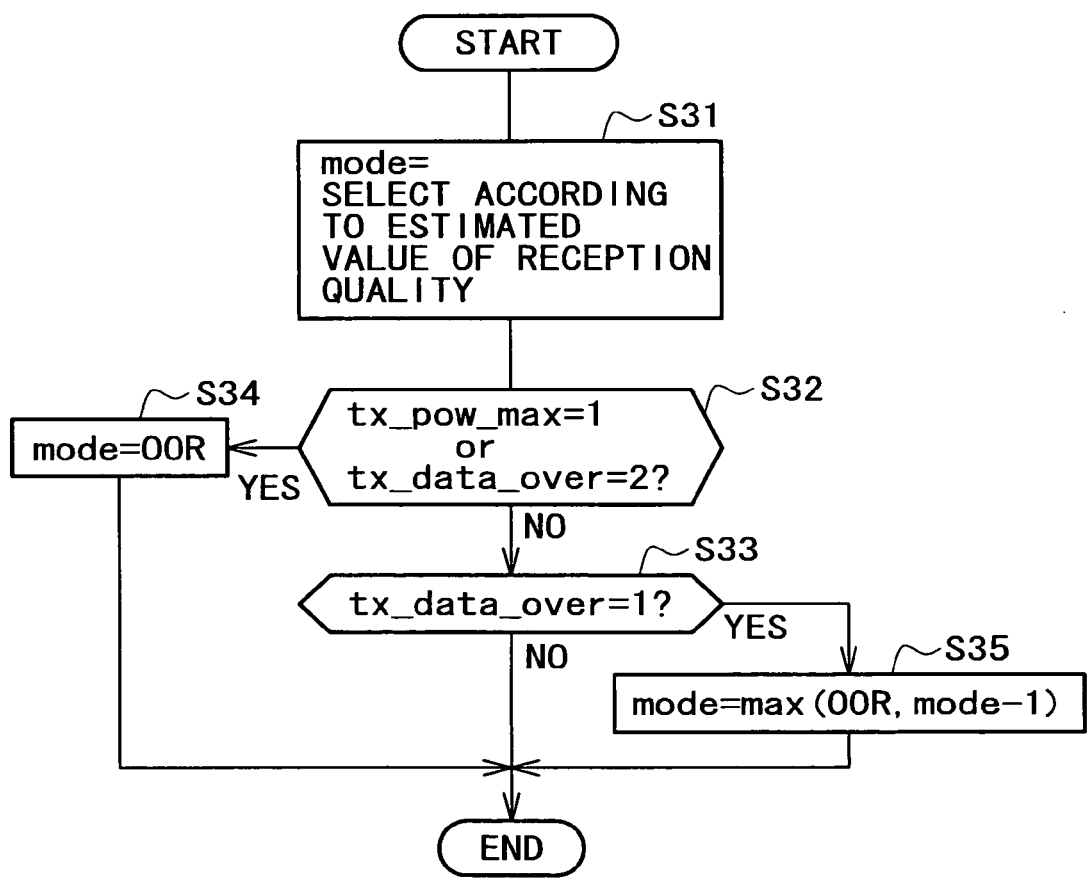
FIG. 9 illustrates a processing flow of the mode selection unit in FIG. 5.
Figure 10:
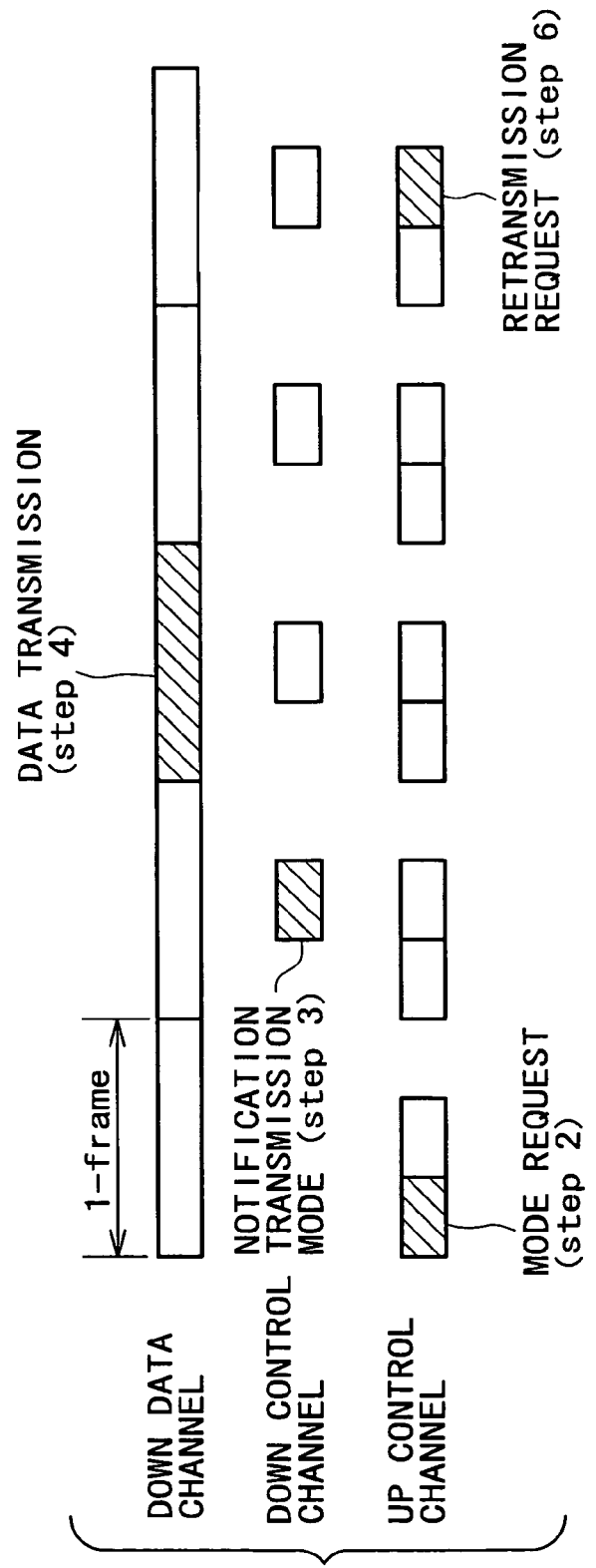
FIG. 10 illustrates a relation between the down control channel, down data channel, and up control channel.
Figure 11:
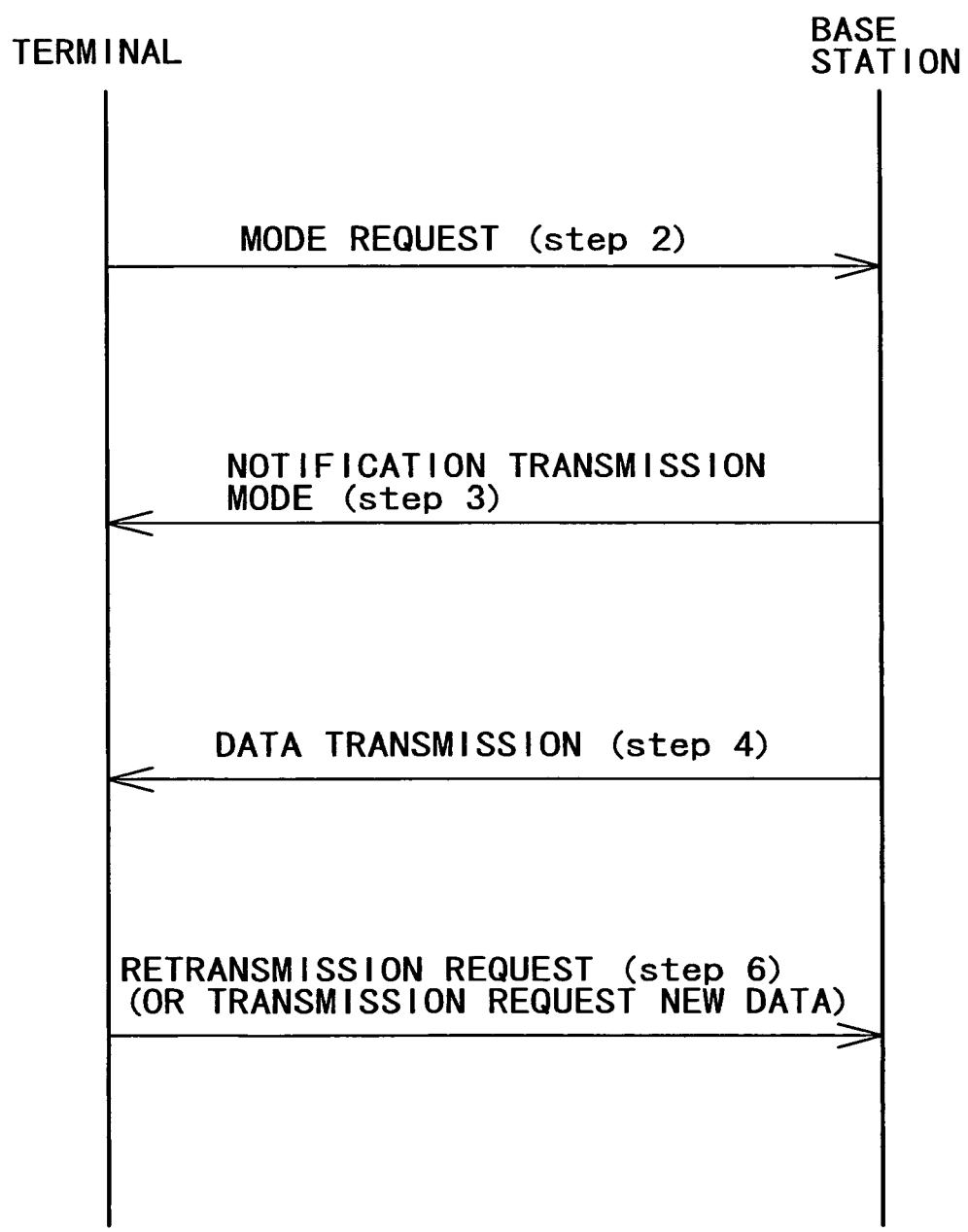
FIG. 11 illustrates a sequence of signal exchanges between the terminal and the base station using the channels illustrated in FIG. 10.

FIG. 9 illustrates the processing flow of the mode selection unit 106. This processing is carried out periodically (for example, at each period of the mode request, at each 2 ms). First, the step S31 acquires the estimated value of the reception quality from the data channel reception quality estimating unit 105, and selects the transmission mode (mode) according to this value. It is stipulated that the mode=1 corresponds to the transmission mode (R=1/2, QPSK), the mode=2 corresponds to the transmission mode (R=1/2, 16QAM), and the mode=3 corresponds to the transmission mode (R=3/4, 16QAM). And, the mode=0 corresponds to the OOR. Next, the step S32 judges the processing result in FIG. 8. If the condition is tx_pow_max=tx_data_over=0, there is not any processing to be carried out, and the processing will be terminated. This means that the transmission mode was selected according to the reception quality estimating unit 105 as the conventional manner. If the condition is tx_pow_max=1, or tx_data_over=2, the step S34 ignores the output from the reception quality estimating unit 105, and outputs the OOR. If the condition is tx_pow_max=0, and tx_data_over=1, the step S35 selects the transmission mode having the mode value lower by 1 than the transmission mode selected according to the reception quality estimating unit 105. Thus, the mode selection unit 106 reports a lower data rate than the data rate whereby the terminal can inherently receive the data. Here, the function max (OOR, mode−1) at S35 means a larger value of the values subtracted by 1 from the values of OOR and mode. When the mode value after the subtraction becomes negative, the OOR is forcibly selected.

As mentioned above, the embodiment determines the transmission mode in accordance with not only the reception quality of the mobile terminal but also the transmission capability thereof. Thereby, the system is able to allocate the radio resources for data transmissions more appropriately to individual mobile terminals.

The preferred embodiments having been described, various modifications and changes are possible with the exception of the above mentioned.

For example, the embodiment determines a primary transmission mode at the mobile terminal, and determines a final transmission mode on the side of the base station. However, it may be arranged to transmit to the base station the information for determining the transmission mode (reception quality, data quantity of the transmission data buffer, transmission power, etc.), and to determine the transmission mode based on the information on the side of the base station. In this case, as the information for determining the transmission mode, the reception quality, data quantity of the transmission data buffer, and transmission power and so forth may be transmitted independently; however, any one of the information (reception quality, for example) corrected by the other information maybe transmitted. In the above description, the base station determines the transmission mode finally; however, the present invention is not to exclude that the base station uses the transmission mode as it is, determined by the mobile terminal.

In the above description, the data transmission is carried out between the base station and the mobile terminal; however, the invention is applicable to the data transmission between arbitrary radio communication devices.

In regard to the concrete modulation system and coding system constituting the transmission mode, the aforementioned systems are only illustrative, and the systems other than the above can be used.

What is claimed is:

1. A radio communication system comprising:
   a first radio communication device being a base station and a second radio communication device being a mobile terminal and for performing radio communications between the first radio communication device and the second radio communication device,
   wherein said radio communication system varies a transmission mode according to conditions at least in a data transmission from the first radio communication device to the second radio communication device, and
   wherein said second radio communication device measures a reception quality and a data transmission capability;
   one of said first and second radio communication devices determines the transmission mode to be used, based on the measured reception quality and data transmission capability; and
   said first radio communication device performs the data transmission to the second radio communication device based on the determined transmission mode,
   wherein a transmission power is periodically compared with predetermined maximum value and a count representing consecutive times that the transmission power exceeds the predetermined maximum value is used for determining the transmission mode.

2. A radio communication system according to claim 1, wherein the data transmission capability is determined on the basis of at least one of a transmission power of said second radio communication device and a data quantity of a transmission data buffer.

3. A radio communication system according to claim 1, wherein the transmission mode is stipulated by at least one of a modulation system and a coding ratio.

4. A radio communication device being a mobile terminal that performs communication with a second radio communication device being a base station, said radio communication device comprising:
   reception quality measuring means for measuring a reception quality,
   data transmission capability measuring means for measuring a data transmission capability,
   determining means for determining a transmission mode on the basis of the measured reception quality and data transmission capability;
   transmitting means for transmitting the determined transmission mode to the second radio communication device;
   first receiving means for receiving information on a transmission mode for use from the second radio communication device; and second receiving means for receiving data from the second radio communication device according to a transmission mode designated by information on the received transmission mode, wherein a transmission power is periodically compared with a predetermined maximum value and a count representing consecutive times that the transmission power exceeds the predetermined maximum value is used for determining the transmission mode.

5. A radio communication device according to claim 4, wherein said data transmission capability measuring means measures a transmission power of the radio communication device.

6. A radio communication device according to claim 4, wherein said data transmission capability measuring means measures a data quantity of a transmission data buffer of the radio communication device.

7. A radio communication device according to claim 6, wherein a transmission mode corresponding to a lower reception quality is selected, as the data quantity of the transmission data buffer approximates to a predetermined memory quantity.

8. A radio communication device according to claim 4, wherein the transmission mode is stipulated by at least one of a modulation system and a coding ratio.

9. A radio communication device being a mobile terminal that performs communication with a second radio communication device being a base station, said radio communication device comprising:

reception quality measuring means for measuring a reception quality;

data transmission capability measuring means for measuring a data transmission capability;

transmitting means for transmitting information on the measured data transmission capability and reception quality to the second radio communication device;

first receiving means for receiving information on a transmission mode that the second radio communication device determined on the basis of information on the measured data transmission capability and reception quality, and second receiving means for receiving data from the second radio communication device according to a transmission mode designated by information on the received transmission mode, wherein a transmission power is periodically compared with a predetermined maximum value and a count representing consecutive times that the transmission power exceeds the predetermined maximum value is used for determining the transmission mode.

10. A radio communication device according to claim 9, wherein said data transmission capability measuring means measures a transmission power of the radio communication device.

11. A radio communication device according to claim 9, wherein said data transmission capability measuring means measures a data quantity of a transmission data buffer of the radio communication device.

12. A radio communication device according to claim 11, wherein a transmission mode corresponding to a lower reception quality is selected, as the data quantity of the transmission data buffer approximates to a predetermined memory quantity.

13. A radio communication device according to claim 9, wherein the transmission mode is stipulated by at least one of a modulation system and a coding ratio.

14. A radio communication device being a mobile terminal that performs communication with a second radio communication device being a base station, said radio communication device comprising:

a reception quality measuring unit that measures a reception quality;

a monitoring unit that measures a data transmission capability, and monitors whether a measured result thereof is in a predetermined state or not;

a mode selection unit that determines a transmission mode on the basis of the measured reception quality and data transmission capability; and a transmission and reception unit that transmits the determined transmission mode to the second radio communication device, receives information on a transmission mode for use from the second radio communication device, and receives data from the second radio communication device according to a transmission mode designated by information on the received transmission mode, wherein a transmission power is periodically compared with a predetermined maximum value and a count representing consecutive times that the transmission power exceeds the predetermined maximum value is used for determining the transmission mode.

15. A radio communication device according to claim 14, wherein said monitoring unit measures a transmission power of the radio communication device.

16. A radio communication device according to claim 14, wherein said monitoring unit measures a data quantity of a transmission data buffer of the radio communication device.

17. A radio communication device according to claim 16, wherein a transmission mode corresponding to a lower reception quality is selected, as the data quantity of the transmission data buffer approximates to a predetermined memory quantity.

18. A radio communication device according to claim 14, wherein the transmission mode is stipulated by at least one of a modulation system and a coding ratio.

19. A radio communication device being a mobile terminal that performs communication with a second radio communication device being a base station, said radio communication device comprising:

a reception quality measuring unit that measures a reception quality;

a monitoring unit that measures a data transmission capability, and monitors whether a measured result thereof is in a predetermined state or not; and a transmission and reception unit that transmits information on the measured data transmission capability and reception quality to the second radio communication device, receives information on a transmission mode that the second radio communication device determined on the basis of information on the measured data transmission capability and reception quality, and receives data from the second radio communication device according to a transmission mode designated by information on the received transmission mode, wherein a transmission power is periodically compared with a predetermined maximum value and a count representing consecutive times that the transmission power exceeds the predetermined maximum value is used for determining the transmission mode.

20. A radio communication device according to claim 19, wherein said monitoring unit measures a transmission power of the radio communication device.

21. A radio communication device according to claim 19, wherein said monitoring unit measures a data quantity of a transmission data buffer of the radio communication device.

22. A radio communication device according to claim 21, wherein a transmission mode corresponding to a lower reception quality is selected, as the data quantity of the transmission data buffer approximates to a predetermined memory quantity.

23. A radio communication device according to claim 19, wherein the transmission mode is stipulated by at least one of a modulation system and a coding ratio.

* * * * *